US011263470B2

(12) United States Patent
Gupta et al.

(10) Patent No.: US 11,263,470 B2
(45) Date of Patent: Mar. 1, 2022

(54) SALIENCY PREDICTION FOR INFORMATIONAL DOCUMENTS

(71) Applicant: Adobe Inc., San Jose, CA (US)

(72) Inventors: Prakhar Gupta, Bengaluru (IN); Shubh Gupta, Delhi (IN); Ritwik Sinha, Bangalore (IN); Sourav Pal, West Bengal (IN); Ajaykrishnan Jayagopal, Mumbai (IN)

(73) Assignee: ADOBE INC., San Jose, CA (US)

( * ) Notice: Subject to any disclaimer, the term of this patent is extended or adjusted under 35 U.S.C. 154(b) by 1068 days.

(21) Appl. No.: 15/814,009

(22) Filed: Nov. 15, 2017

(65) Prior Publication Data

US 2019/0147288 A1     May 16, 2019

(51) Int. Cl.
*G06K 9/46*     (2006.01)
*G06K 9/62*     (2022.01)
(Continued)

(52) U.S. Cl.
CPC ........... *G06K 9/4671* (2013.01); *G06F 3/013* (2013.01); *G06F 16/358* (2019.01);
(Continued)

(58) Field of Classification Search
CPC .. G06K 9/4671; G06K 9/6202; G06K 9/6269; G06F 16/358; G06F 16/986;
(Continued)

(56) References Cited

U.S. PATENT DOCUMENTS

| | | |
|---|---|---|
| 10,346,524 B1 | 7/2019 | Zheng |
| 2018/0068198 A1 | 3/2018 | Savvides et al. |

(Continued)

FOREIGN PATENT DOCUMENTS

| | | | | |
|---|---|---|---|---|
| CN | 103793717 A | * | 5/2014 | |
| GB | 2415562 A | * | 12/2005 | ........... G06K 9/3233 |

OTHER PUBLICATIONS

Cerf, M. (Mar. 26, 2008). Using semantic content as cues for better scanpath prediction. ACM Digital Library, https://dl.acm.org/doi/10.1145/1344471.1344508 (Year: 2008).*

(Continued)

*Primary Examiner* — Li Wu Chang
(74) *Attorney, Agent, or Firm* — F. Chau & Associates, LLC

(57) ABSTRACT

A content saliency network is a machine-learned neural network that predicts the saliency of elements of a content item. The content saliency network may be used in a method that includes determining a set of elements in draft content and computing a first pixel-level vector for the content. The method may also include, for each element in the set of elements, computing a vector of simple features for the element, the simple features being computed from attributes of the element, computing a second pixel-level vector for the element, computing a third pixel-level vector for an intermediate context of the element, and providing the vectors to the content saliency network. The content saliency network provides a saliency score for the element. The method further includes generating an element-level saliency map of the content using the respective saliency scores for the set of elements and providing the saliency map to a requestor.

20 Claims, 9 Drawing Sheets

(51) Int. Cl.
  G06Q 30/02     (2012.01)
  G06F 3/01      (2006.01)
  G06N 3/08      (2006.01)
  G06F 16/958    (2019.01)
  G06F 16/35     (2019.01)
  G06N 3/04      (2006.01)

(52) U.S. Cl.
  CPC ......... *G06F 16/986* (2019.01); *G06K 9/6202* (2013.01); *G06K 9/6269* (2013.01); *G06N 3/0454* (2013.01); *G06N 3/08* (2013.01); *G06Q 30/0244* (2013.01)

(58) Field of Classification Search
  CPC ........ G06F 3/013; G06N 3/0454; G06N 3/08; G06Q 30/0244
  See application file for complete search history.

(56) References Cited

U.S. PATENT DOCUMENTS

2018/0240221 A1  8/2018  Rijnders
2019/0065471 A1  2/2019  Comeau et al.
2019/0147288 A1  5/2019  Gupta et al.

OTHER PUBLICATIONS

Cholakkal, H. (Apr. 22, 2016). A classifier-guided approach for top-down salient object detection. arXiv.org. https://arxiv.org/abs/1604.06570 (Year: 2016).*

Judd, T. (Oct. 22, 2009). Learning to predict where humans look. People | MIT CSAIL. https://people.csail.mit.edu/tjudd/WherePeopleLook/index.html (Year: 2009).*

Nguyen, T. (Oct. 21, 2013). Static saliency vs. dynamic saliency | Proceedings of the 21st ACM International Conference on multimedia. ACM Digital Library, https://dl.acm.org/doi/10.1145/2502081.2502128 (Year: 2013).*

Shen, C. (Sep. 12, 2014). Webpage saliency. SpringerLink. https://link.springer.com/chapter/10.1007/978-3-319-10584-0_3 (Year: 2014).*

Stentiford, F. (Mar. 24, 2007). Attention based auto image cropping. Semantic Scholar | AI-Powered Research Tool, https://www.semanticscholar.org/paper/Attention-Based-Auto-Image-Cropping-Stentiford/0379795264b1a8976de1ee0b540dbb5e260cd304 (Year: 2007).*

Xu, P. (May 7, 2016). Spatio-temporal modeling and prediction of visual attention in graphical user interfaces. ACM Digital Library. https://dl.acm.org/doi/10.1145/2858036.2858479 (Year: 2016).*

Beymer et al. "WebGazeAnalyzer: A System for Capturing and Analyzing Web Reading Behavior Using Eye Gaze", CHI 2005, pp. 1913-1916.*

Han et al., "Two-Stage Learning To Predict Human Eye Fixations Via SDAES"; IEEE Transactions on Cybernetics, vol. 46, No. 2; Feb. 2016; pp. 487-498.

Shen et al., "Learning High-Level Concepts By Training a Deep Network On Eye Fixations"; NIPS Deep Learning and Unsup Feat Learn Workshops vol. 2; 2012; pp. 1-9.

Shen et al., "Learning To Predict Eye Fixations for Semantic Contents Using Multi-Layer Sparse Network"; Neurocomputing 138 (2014); pp. 61-68.

"Eye tracking in advertising research—Tobii Pro", downloaded from https://www.tobiipro.com/fields-of-use/marketing-consumer-research/advertising/, retrieved on Oct. 10, 2017, 14 pages.

"MIT Saliency Benchmark", retrieved from http://saliency.mit.edu/results_mit300.html, downloaded on Oct. 10, 2017, 17 pages.

"SalNet: Deep Convolutional Networks for Saliency Prediction", retrieved from https://algorithmia.com/algorithms/deeplearning/SalNet, downloaded on Oct. 10, 2017, 4 pages.

Bylinskii, et al., "Learning Visual Importance for Graphic Designs and Data Visualizations", Proceedings of the 30th Annual ACM Symposium on User Interface Software & Technology (UIST '17), http://dx.doi.org/10.1145/3126594.3126653, Aug. 8, 2017, 13 pages.

Jahanian, et al., "Recommendation System for Automatic Design of Magazine Covers", Proceedings of the 2013 International Conference on Intelligent User Interfaces (IUI '13), DOI: https://doi.org/10.1145/2449396.2449411, Mar. 2013, New York, NY, pp. 95-106.

Krafka, et al., "Eye tracking for Everyone", Proceedings of the IEEE Conference on Computer Vision and Pattern Recognition, 2016, 9 pages.

Liu, et al., "Predicting Eye Fixations using Convolutional Neural Networks", Proceedings of the IEEE Conference on Computer Vision and Pattern Recognition, 2015, 9 pages.

Ma, et al., "Advertisement evaluation using visual saliency based on foveated image", Multimedia and Expo, 2009, ICME 2009, IEEE International Conference on. IEEE, 2009, 4 pages.

Pan, et al., "Shallow and Deep Convolutional Networks for Saliency Prediction", Proceedings of the IEEE Conference on Computer Vision and Pattern Recognition, Mar. 2, 2016, pp. 1-10.

Wadhwa, Tarun, "Eye-Tracking Technologies Are About To Make Advertising Even More Invasive", retrieved from https://www.forbes.com/sites/tarunwadhwa/2013/05/08/with-recent-advances-in-eye-tracking-advertising-set-to-become-even-more-invasive, Forbes, May 8, 2013, 4 pages.

Li, et al., "Webpage Saliency Prediction with Multi-features Fusion", Image Processing (ICIP), 2016 IEEE International Conference on. IEEE, 2016, 5 pages.

Roller, Colleen, "Using Salience to Guide User Decision-Making", retrieved from https://uxmag.com/articles/using-salience-to-guide-user-decision-making, UX Magazine, Article No. 795, Mar. 2012, 9 pages.

Still, et al., "A Saliency Model Predicts Fixations in Web Interfaces", 5th International Workshop on Model Driven Development of Advanced User Interfaces (MDDAUI2010), Apr. 2010, 5 pages.

Xu, et al., "Spatio-Temporal Modeling and Prediction of Visual Attention in Graphical User Interfaces", Proceedings of the 2016 CHI Conference on Human Factors in Computing Systems, May 2016, 12 pages.

\* cited by examiner

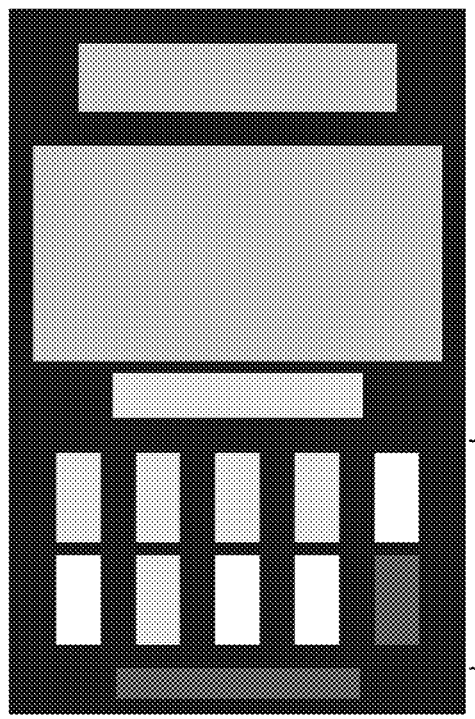
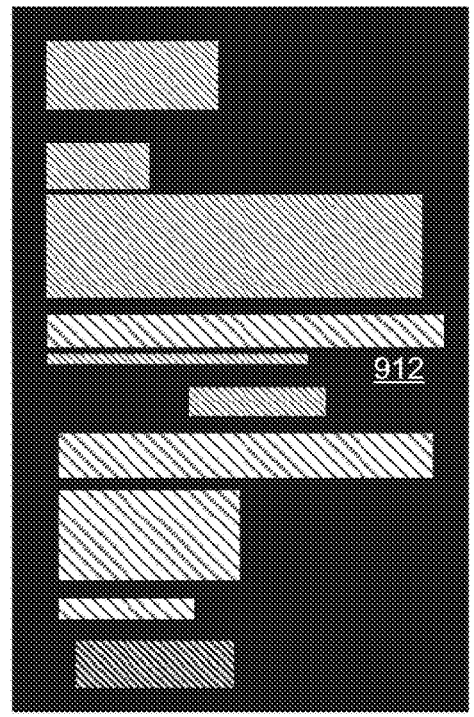
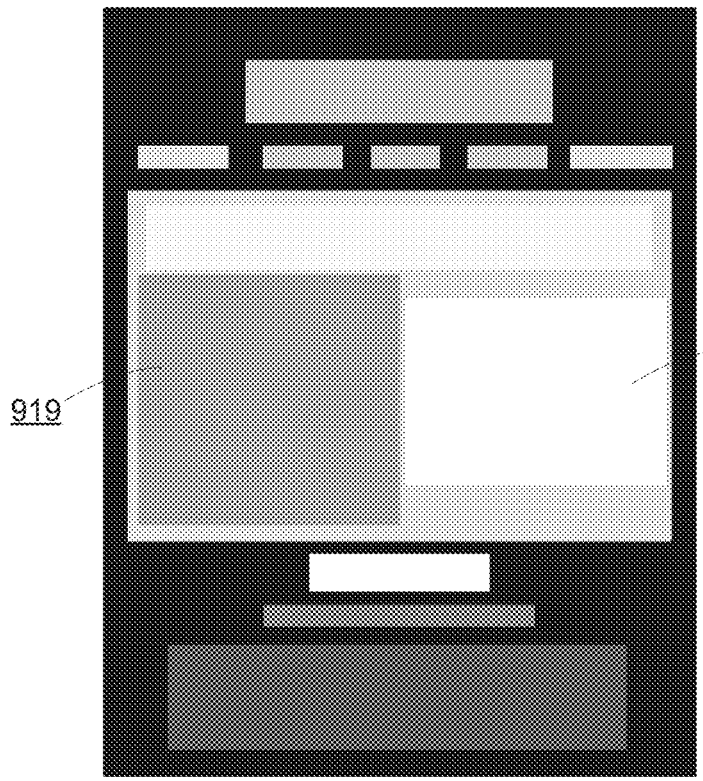
FIG. 9

SALIENCY PREDICTION FOR INFORMATIONAL DOCUMENTS

TECHNICAL FIELD

This description relates to training and use of neural networks for predicting the saliency of content elements.

BACKGROUND

Neural networks, especially deep neural networks have been very successful in modeling high-level abstractions in data. Neural networks are computational models used in machine learning made up of nodes organized in layers. The nodes are also referred to as artificial neurons, or just neurons, and perform a function on provided input to produce some output value. A neural network requires a training period to learn the parameters, i.e., weights, used to map the input to a desired output. Each neural network is trained for a specific task, e.g., prediction, classification, encoding, etc. The task performed by the neural network is determined by the inputs provided, the mapping function, and the desired output. Training can be either supervised or unsupervised. In supervised training, training examples are provided to the neural network. A training example includes the inputs and a desired output. Training examples are also referred to as labeled data because the input is labeled with the desired output. The network learns the values for the weights used in the mapping function that most often result in the desired output when given the inputs. In unsupervised training, the network learns to identify a structure or pattern in the provided input. In other words, the network identifies implicit relationships in the data. Unsupervised training is used in deep neural networks as well as other neural networks and typically requires a large set of unlabeled data and a longer training period. Once the training period completes, the neural network can be used to perform the task for which it was trained.

In a neural network, the neurons are organized into layers. A neuron in an input layer receives the input from an external source. A neuron in a hidden layer receives input from one or more neurons in a previous layer and provides output to one or more neurons in a subsequent layer. A neuron in an output layer provides the output value. What the output value represents depends on what task the network is trained to perform. Some neural networks predict a value given in the input. Some neural networks provide a classification given the input. When the nodes of a neural network provide their output to every node in the next layer, the neural network is said to be fully connected. When the neurons of a neural network provide their output to only some of the neurons in the next layer, the network is said to be convolutional. In general, the number of hidden layers in a neural network varies between one and the number of inputs.

Information is often disseminated in textual content items, such as documents. These content items may be intended to persuade the reader or to induce the reader to perform some action. An example content item is a document or an email. Other examples include a pamphlet, a web page, a poster, etc. Content items have at least one text-based element. For example, an email may include a title, a heading, and one or more images. The images may also include text. In a content item, a text description often accompanies an image. Some content items may include action items, e.g., buttons or links, and the document content creator may intend for the document to persuade the recipient to select the action item.

Designing informational content items typically involves making many choices, such as font color and size, image placement, heading size and placement, size, color, and placement of controls or other action items, etc. Current software applications provide a content creator with the ability to make these design choices in the layout of the content. While such applications show the content creator how the information will appear in the finished content item, they do not provide any guidance on the effectiveness of the content, e.g., in drawing attention to a particular element or elements of the content.

SUMMARY

A content saliency neural network, also referred to as a content saliency network, is a machine-learned neural network trained to predict the saliency of elements in a content item. Saliency is the state or quality by which an element stands out relative to its neighbors. Saliency can thus represent the likelihood that the element draws attention to itself. The content saliency neural network may be trained to provide a saliency score for each of a set of elements in a content item. The saliency score represents the probability of a human viewing the content to look at the element within a predetermined time and is based on the visual features of the element and the content in general. The content saliency neural network may be trained using eye-gaze information from various users in the first few seconds of viewing existing content items. The saliency neural network may generate four feature vectors for each element identified in a digital version of the content. One feature vector represents simple features of the element. Simple features represent characteristics of the element discernible from the content itself, such as width, height, color moments of the element, etc. The remaining three feature vectors represent pixel-level feature vectors for multiple zoom levels. Each zoom level represents a context. In some implementations, the three pixel-level feature vectors may be obtained using transfer learning e.g., another neural network. The training example may include the four feature vectors for an element and a saliency score generated for the element from the eye gaze data that corresponds to the content item.

Once trained, the saliency neural network can be used to predict the saliency of the various elements that make up a future, e.g., not created at the time of training, content item. For example, a content item may be provided to the system, feature vectors determined for the various content elements, and a saliency prediction obtained for each content element. In some implementations, the system may present the saliency of the content elements in a saliency map. A content creator can use the saliency map to determine whether content elements have intended saliency and, if not, revise the content item layout. In some implementations, the saliency map may be a heat map.

Disclosed implementations can include one or more of the following benefits. For example, the content saliency neural network can be used to speed up the design process for a content item, significantly reducing the turn-around time. The design process is sped up because the content saliency neural network provides a tool for selecting color, shape, position, size, etc. of various content elements without obtaining human feedback. In other words, the content saliency neural network can be used to compare two versions of a content item layout immediately. In contrast, obtaining human feedback on the two versions can take hours, if not days. As another example, the content saliency neural network provides objective rather than subjective feedback. Human feedback is subjective, not representative of a larger population, and not based on actual viewing patterns. Thus, the content saliency neural network is more accurate than human feedback because it is based on objective data gathered from hundreds or thousands of workers rather than subjective judgment from a couple of coworkers or designers.

As another example, the content saliency neural network provides feedback at an element level. This is beneficial because content elements correspond to elements for which a content creator can take action. Providing saliency at the element level, rather than at the pixel level, makes it easier for a content creator to manipulate the layout to improve saliency, if needed. The content saliency neural network can be used to produce better quality content items that maximize the chances of the content having the intended effect on the recipient. The saliency of the elements in the content provides feedback on which elements are likely to be viewed within the first few seconds, so that elements considered most important by the content creator are most likely to be seen by the recipient. Such information is beneficial because, for example, recipients of email messages may spend only a few seconds viewing the email; thus where the recipient's gaze will likely fall within these first few seconds provides valuable feedback to the email content creator. The content saliency neural network can be included as a tool in a content design application, such as an email editor, an HTML editor, a word processing program, a presentation program, a spreadsheet program, or any other similar application. The content saliency neural network can also be made available as a separate service, e.g., over a network such as the Internet.

The details of one or more implementations are set forth in the accompanying drawings and the description below. Other features will be apparent from the description and drawings, and from the claims.

BRIEF DESCRIPTION OF THE DRAWINGS

FIG. 9 illustrates additional example saliency maps.

DETAILED DESCRIPTION

Figure 1:
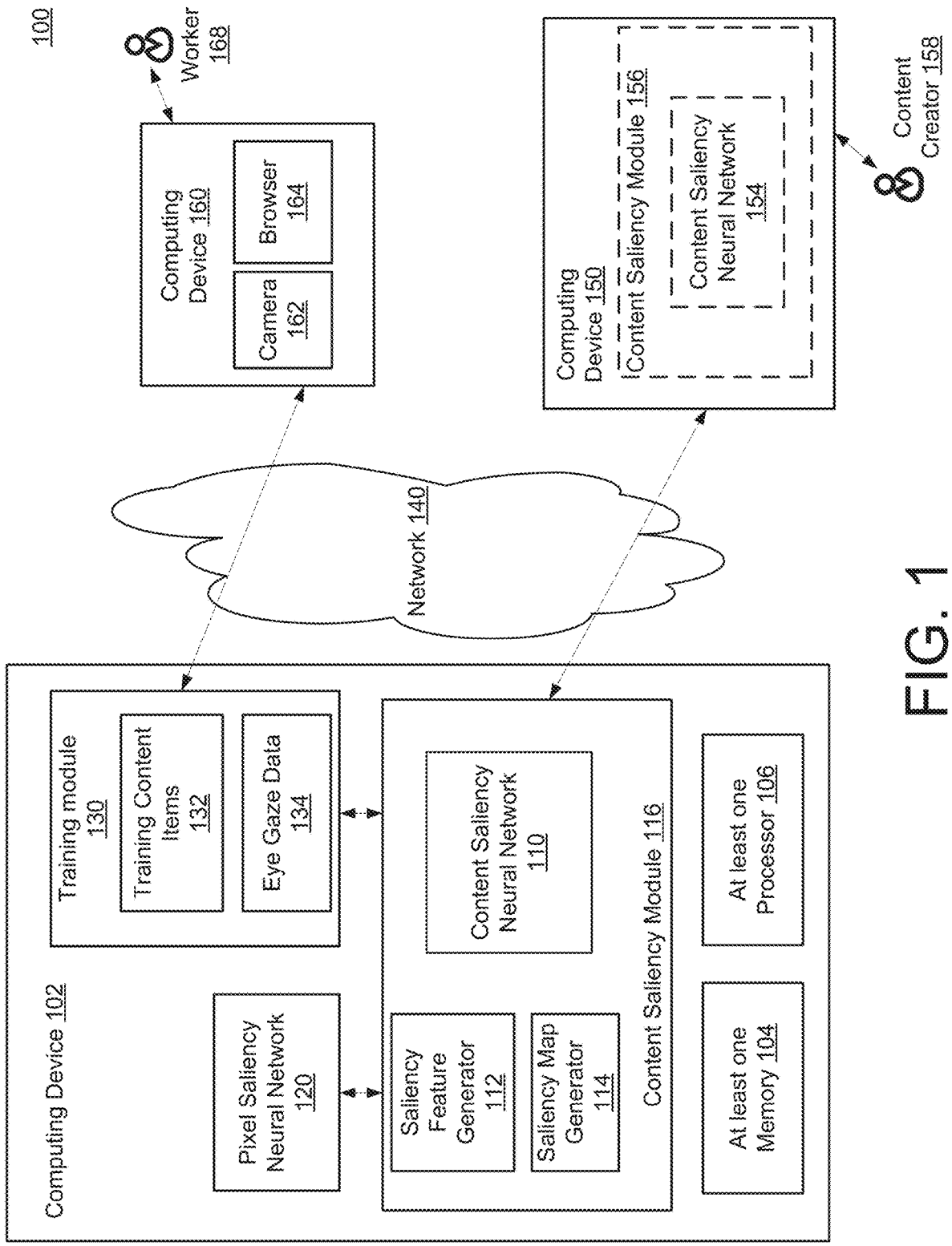
FIG. 1 is a block diagram of a system for providing saliency feedback for elements of a content item using a saliency neural network, according to an implementation.

Systems and methods train a machine-learned content saliency neural network to predict the saliency of content elements, enabling a content creator to determine whether a particular content item layout has an intended effect and to manipulate the elements to improve the effectiveness of the content. Saliency provides an indication of what a reader will see in the first few seconds of viewing the content. Thus, implementations guide a content creator during the creative process so that elements the content creator desires to be read have the best chance of actually being viewed by a reader. A content saliency neural network is trained using actual eye-gaze data for a set of training content items. The training content items are historical content items, meaning they have been previously provided to recipients, e.g., emails sent to one or more recipients. The content saliency neural network generates simple features extracted from given content, as well as pixel-based features for different resolutions for each content element. Using these features, the content saliency neural network predicts which elements have a high probability of being viewed first and which do not. The content saliency neural network has a low memory footprint, e.g., around 30 mb and can be provided as a cloud-based service or downloaded to an author's computing device.

As used herein, content items refer to files that have at least one text-based element used to convey information to a reader. Example content items include documents, emails, pamphlets, web pages, posters, presentation slides, and the like. Content refers to the text, images, and other information that make up the content item. A content element, or just element. is any object on which a content creator can take action. Examples of an element include a title, a heading, an image, a paragraph, a table, a text box, a button, a link, a span, etc. Some elements may correspond to objects in a document object model (DOM). A document object model is a tree data structure for content items in a mark-up language format where each node in the tree represents a part of the markup-based content designated by a markup tag. Natural images refer to images that do not generally include text and instead are mostly images of places, people, and objects. For example, an image that is at least 50% text represents content, while an image with less than 50% text represents a natural image.

As used herein, a saliency score for an element is a measure of how much the element stands out relative to its neighbors; e.g., the higher the saliency score for an element, the more likely it is that the reader will view the element within a given time frame (e.g., a few seconds). As used herein, saliency is based on eye gaze data. Eye gaze data is data that represents which elements in a particular content item correspond to viewed coordinates on a display of the content item, the viewed coordinates being determined by recording a viewer looking at the display. Put another way, eye gaze data is data that measures how much a particular element actually stood out relative to its neighbors to a human viewer.

As used herein, neural networks refer to computational models used in machine learning and are made up of nodes organized in layers. Training a neural network is using training examples, each example being an input and a desired output, to let the neural network, over a series of iterative rounds, determine optimal weight values in the mapping function that result in the neural network providing the desired output given the input. During each round, the weights in the mapping function are adjusted to address incorrect output. Once trained, the neural network can be used to predict an output based on provided input. Input to a neural network is typically in the form of a feature vector.

A feature vector is an array of numbers. The numbers may be integers or floating point numbers. The array may be one or more dimensions.

As used herein, a content saliency neural network takes as input a simple feature vector and two or more pixel-level feature vectors and provides as output a saliency score for a content element. A simple feature represents a characteristic or attribute of the content element, such as color, width, height, area, etc., of the element. The color may be represented by color moments for the three color channels. A color moment characterizes color distribution in an image, similar to moments of a probability distribution. The pixel-level feature vectors for an element are saliency matrices. A saliency matrix is a pixel-by-pixel representation of an image where each pixel is represented in the matrix by a value that represents the salience of the pixel within the image. In some implementations, the value may be between 0-255, with higher numbers corresponding to higher salience. The saliency matrix may be the output of a neural network trained to provide the saliency of each pixel in a natural image. The images provided to a neural network trained to provide the saliency matrix correspond to zoom levels for the element. A zoom level represents some level of context for an element, with a highest zoom level being the element and a lowest zoom level being the content item in which the element is found. A high zoom level represents low context information for the element because it does not include any, or very little, of the content outside of the element itself. The lowest zoom level may correspond to a bounding box. A bounding box is the smallest shape, typically but not always a rectangular box, that encloses the entire element. A low zoom level represents high context information for the element, as it includes all or almost all content from the content item. An intermediate zoom level is a zoom level that falls between the highest and lowest zoom level. This represents intermediate context for the element, as it includes some content outside the element itself but less than all or almost all content from the content item. A saliency map displays the elements in a content item represented by their respective saliency scores. The saliency map may use variation in color and/or pattern to represent various saliency ranges.

Details of the systems and techniques are discussed below with respect to the illustrated figures. FIG. 1 is a block diagram of a system 100 for training and using a content saliency neural network 110. The system 100 includes a computing device 102 having at least one memory 104, at least one processor 106, and one or more modules, such as training module 130 and content saliency module 116. The computing device 102 may communicate with one or more other computing devices, e.g., computing device 150 and computing device 160 over a network 140. The computing device 102 may be implemented as a server, a desktop computer, a laptop computer, a mobile device such as a tablet device or mobile phone device, as well as other types of computing devices. Although a single computing device 102 is illustrated, the computing device 102 may be representative of multiple computing devices in communication with one another, such as multiple servers in communication with one another being utilized to perform its various functions over a network.

The at least one processor 106 may represent two or more processors on the computing device 102 executing in parallel and utilizing corresponding instructions stored using the at least one memory 104. In some implementations, the at least one processor 106 may be a specialized processor, e.g. a graphics processing unit (GPU). The at least one memory 104 represents a non-transitory computer-readable storage medium. Of course, similarly, the at least one memory 104 may represent one or more different types of memory utilized by the computing device 102. In addition to storing instructions, which allow the at least one processor 106 to implement disclosed embodiments, the at least one memory 104 may be used to store data, such as one or more of the training content items 132, eye gaze data 134, a pixel-saliency neural network 120 and/or the content saliency neural network 110. The at least one memory 104 may also be used to store processes and modules, such as training module 130 or content saliency module 116, saliency feature generator 112, saliency map generator 114, etc., and their components.

The training module 130 may be configured to generate eye gaze data 134 from a set of training content items 132. The training content items 132 are any type of content items with text, such as a document, an email, a web page, a pamphlet, a poster, etc. In some implementations, the content item may be HTML-based, PDF-based, image-based, rich text based, etc. The content item may be created in an HTML editor, a word processing program, a presentation program, a PDF program, an image editing program, a spreadsheet program, or the like. In some implementations, the training content items 132 include historical email content, e.g., HTML-based email messages that have been sent to recipients. In one implementation, historical email content includes any email-based items actually sent to recipients. Of course the training content items 132 may include other historical content items, i.e., content items that have been made available to and viewed by the intended recipients.

Each content item in the set of training content items 132 may include a plurality of elements. An element is any object on which the content creator can take action. Examples of elements include a title, a heading, an image, a paragraph, a table, a text box, a button, a link, a span, etc. In some implementations, the elements may be defined by a user, e.g., by tagging or a GUI-based selection. For example, a GUI (graphical user interface) may enable a content creator to designate an element by drawing a box or other shape around the element. In some implementations, the training module 130 may automatically detect the elements, e.g., using a document object model (DOM) tree for the content item. A DOM tree is associated with markup based content, such as HTML, and each node in the tree represents a part of the markup-based content designated by a markup tag. In some implementations, the training module 130 may communicate with and use a component of the content saliency module 116, which determines the elements.

To obtain the eye gaze data 134 the training module 130 may generate crowd-source tasks designed to receive video for each of the training content items. In some implementations, the training module 130 may generate crowd-source training tasks that result in a predetermined number of workers providing eye gaze data for a particular training content item. For example, the crowd-sourced training tasks may ensure that at least x workers view one particular training content item, so that the particular training content item has x sets of corresponding video stream that may be stored as part of eye gaze data 134. The value of x can be any predetermined number can be any number greater than two. In an example where x is eight, each training content item in the set of training content items 132 has eight sets of eye gaze data 134. In some implementations, the crowd-sourced task for a particular worker may include a predetermined number of training content items 132. For example, a worker may view 15 training content items as part of the crowd-source task, providing a video stream stored in eye gaze data 134 for each of the 15 training content items. The worker may be asked just to view the content, with no other specific directions or task given.

The eye gaze data 134 may include a video stream collected from a computing device 160 operated by a worker 168 over network 140, which may include the Internet. The crowd-source task may be browser-based, so computing device 160 may run browser 164. In some implementations, the crowd-source task may be accomplished with a mobile application instead of a browser. The computing device 160 may also include a front-facing camera 162, which records video of the worker 168 as the worker 168 views a training content item provided in the crowd-sourced task. The computing device 160 may be a personal computer with a web camera, a laptop computer with a web camera, a mobile phone, a tablet with a front-facing camera, a wearable device with a front facing camera, or the like.

The eye gaze data 134 can be collected using an application, including a browser 164, that displays the training content item for a number of seconds while recording video of the worker 168 during those seconds with a front-facing (e.g., "selfie" or web) camera 162. Once the training module 130 obtains the video it may generate gaze points for each frame of the video. In some implementations, the training module 130 may generate a cropped image of the face, the left eye, and the right eye from the frame, as well as a face grid representing the position of the face within the frame. The training module 130 may use conventional techniques, such as face and eye detection functions available in the dlib open-source library, or other similar or later developed techniques. The training module 130 generates a gaze point for the frame from the cropped images and the face grid. A gaze point is an x,y coordinate representing a location on the display at which the worker's eyes are fixated in the frame. In some implementations, the training module 130 may use an eye-tracking neural network to generate the gaze point. iTracker is an example eye-tracking neural network that can be used to generate the gaze points for the eye gaze data 134. iTracker is a convolutional neural network for eye tracking developed by K. Krafka et al. that takes as input the cropped images of the face, right eye, left eye, and face grid and provides as output the x,y coordinate for the frame. Other similar techniques may be used. The training module 130 may generate a gaze point for each frame of the video in the first n seconds of the video. The training module 130 may determine which element(s) of the training content item a worker viewed in the first n seconds of the video. The value of n may be dependent on use-case. For example, a content item that is an advertisement may want a small value for n, e.g., only a few seconds, where a content item that is a web page may tolerate a longer value for n.

The training module 130 may generate a saliency score for each element in each training content item. The saliency score represents how often and for how long the workers gazed at the element during the tasks and is based on a proportion of the total possible gaze points across all workers for the content item that correspond with the element. Put another way, the saliency score is a measure of how much the element stands out relative to its neighbors. For example, a content item with four elements viewed by four workers over five seconds generates a total of 20 possible gaze point locations. If two of the workers gaze at element 1 for all 5 seconds, and two of the workers gaze at element 1 for two seconds and element 3 for three seconds, the training module 130 may determine that elements 2 and 4 have a saliency score of zero, element 3 has a saliency score of 0.3, and element 1 has a saliency score of 0.7. The saliency score for each element in each training content item may be considered part of the eye gaze data 134, even if it is calculated at training time and only temporarily stored.

The eye gaze data 134 is data from which a saliency score for each content element in the training content items can be determined. In some implementations, the system may store the video streams captured via the crowdsource tasks and then may calculate the gaze points and then the saliency score for each content element at training time. In such an implementation, each video stream may be associated with a particular training content item in eye gaze data 134. In some implementations, the system may store a set of coordinates for each frame of the video stream that falls within the first n seconds of the video stream, n being a predetermined integer and may calculate the saliency scores at training time. In such implementations, each training content item is associated with a set of coordinates in eye gaze data 134. Thus, if a content item is viewed by ten workers, the content item will have ten sets of coordinates, each set including a coordinate for each frame in the first n seconds of a video stream for the content item. In some implementations, the system may store, for each content element in each training content item, a count of the gaze points that correspond with a location of the element. In such implementations, the eye gaze data 134 may associate each training content item with a count for each of its content elements and calculate the saliency scores at training time. In some implementations, the eye gaze data 134 is the calculated saliency scores for each content element of each training content item. Of course, implementations may include two or more of the combinations described above.

The training module 130 may train a content saliency neural network 110 using the training content items 132 and the corresponding eye gaze data 134. The content saliency neural network 110 is trained to provide a saliency score for an element of a content item. Saliency of the various elements may be particularly important for content items that endeavor to solicit some response or action from the recipient. In some implementations, the content saliency neural network 110 is a component of a content saliency module 116. In some implementations, the content saliency neural network 110 (not shown) is separate from, but operably coupled to (accessible by) the content saliency module 116. The content saliency module 116 may be configured to receive a content item, e.g., a training content item or a draft content item, identify or determine the elements of the content item, and generate feature vectors for each identified element. To identify the content elements, the content saliency module 116 may use the DOM tree if the content has a mark-up language (e.g., HTML) format, or something similar, as described above. The content saliency module 116 may also use data provided by a user that identifies or tags areas of the content item as elements. In some implementations, the content saliency module 116 may convert the content to an image for further processing, if the content item was not provided in an image format.

The content saliency module 116 may include saliency feature generator 112. The saliency feature generator 112 may be a module or engine that is incorporated into the content saliency module 116 or may be separate from, but work with, the content saliency module 116. The saliency feature generator 112 may generate at least three feature vectors for each element of a provided content item. If called from the training module 130, the saliency feature generator 112 generates the feature vectors for a training content item.

A feature vector is an array of numbers. The numbers may be integers or floating point numbers. The first feature vector is a vector of simple features. A simple feature represents a characteristic or attribute of the content element, such as color, width, height, area, etc., of the element. The color may be represented by color moments for the three color channels. A color moment characterizes color distribution in an image. In some implementations, color moments are computed per channel (e.g. 6 moments). Computing color moments is done in the same way as computing moments of a probability distribution. Each attribute may be represented by one or more positions in the array. For example, the width may be represented by one array position while the color may be represented by multiple, e.g. six, array positions.

Figure 7:
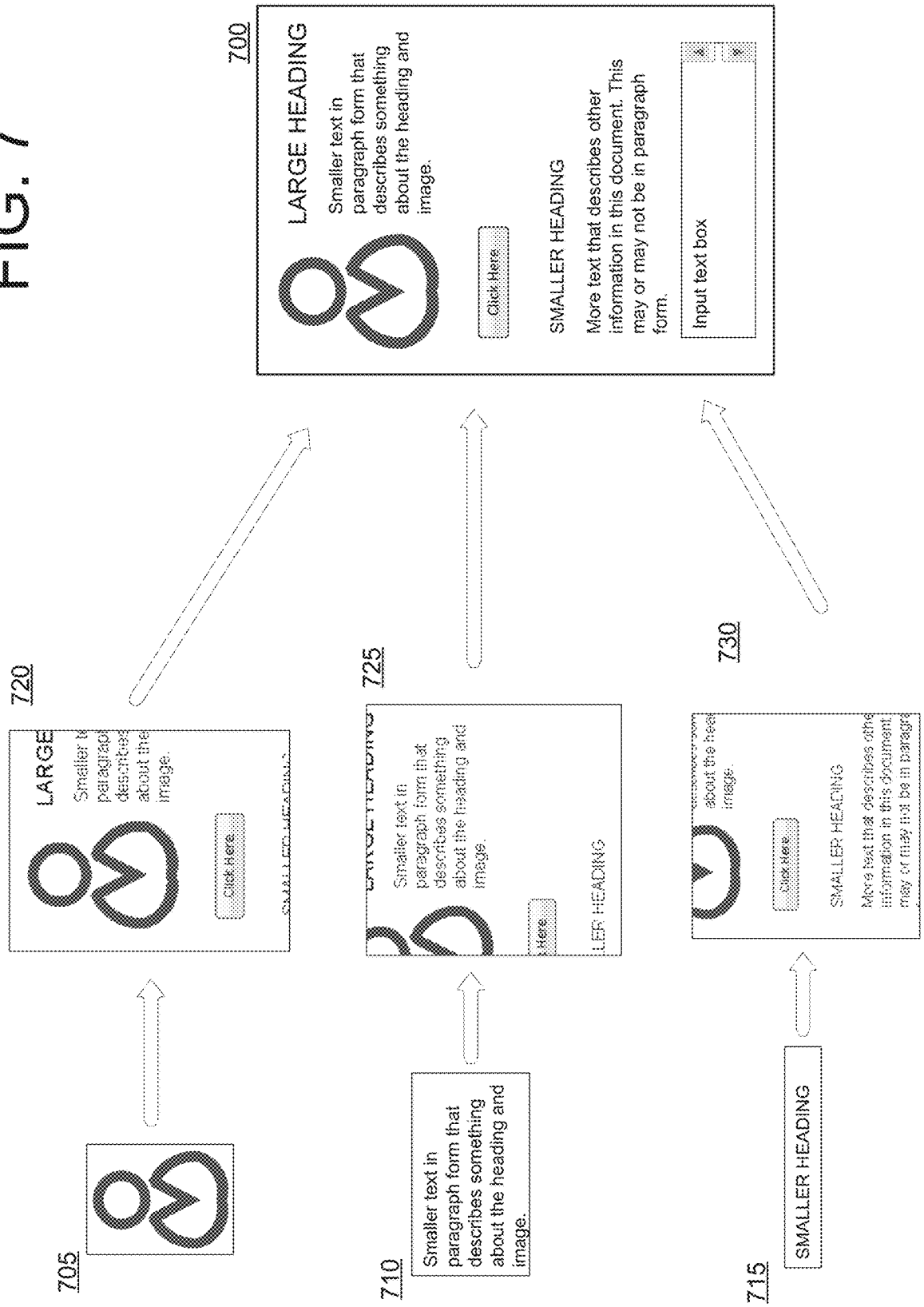
FIG. 7 is an illustration of example elements included in a content item and the various resolutions used to generate feature vectors for the saliency neural network, according to one example.

The remaining vectors generated by the saliency feature generator 112 represent pixel-level saliency data for the element at various zoom levels. Because the saliency data is at the pixel-level, the remaining vectors may also be referred to as pixel-level feature vectors. The saliency feature generator 112 may use an image of the content, e.g., generated by the content saliency module 116, to obtain the pixel-level vectors. The saliency feature generator 112 may generate a pixel-level vector for at least two zoom levels for each element. Each zoom level represents some level of context for the element. A highest zoom level is the element. This zoom level represents low context for the element because it does not include any, or very little, context information from the content outside of the element itself. A lowest zoom level is the content item. This represents high context for the element, as it includes all or almost all content from the content item. In some implementations, the saliency feature generator 112 may include one or more intermediate zoom levels. This represents intermediate context for the element, as it includes some content outside the element itself but less than all or almost all content from the content item. For example, one intermediate zoom level may represent an area that is half-way between the element itself and the edge of the content item. This resolution may be determined by a half-way point on each side of a bounding box for the element. A bounding box is the smallest shape, typically but not always, a rectangular box that encloses the entire element. FIG. 7 illustrates the different zoom levels for three of six elements in informational content item 700. The element 705 is a highest zoom level, representing the element itself. Intermediate resolution 720 represents an intermediate zoom level for element 705, and the full content item 700 represents a lowest zoom level for element 705. Similarly, element 710 has a highest zoom level that is the element 710 itself, an intermediate resolution of 725, and a lowest zoom level represented by content item 700. As the zoom level decreases, more context information is included.

The saliency feature generator 112 may generate a first pixel-level vector for the entire content item. In other words, the first pixel-level vector may represent data for an image of the entire content item. In some implementations, the saliency feature generator 112 may take advantage of transfer learning to generate the pixel-level vectors. For example, the saliency feature generator 112 may provide the image corresponding to the zoom level to a trained pixel-saliency neural network 120. The pixel-saliency neural network 120 may be a deep neural network trained to provide saliency data for pixels of an image. The pixel-saliency neural network 120 may be trained on a large collection of natural images. Natural images do not generally include text and instead are mostly images of places, people, and objects. In contrast, content, as used herein, includes mostly text, although content items may also include natural images. Thus, an image that is at least 50% text is content, while an image with less than 50% text is a natural image. The pixel-saliency neural network 120 may take as input an image. For example, an image corresponding to element 705, to the intermediate resolution 720, or to the content item 700. The pixel-saliency neural network 120 may provide as output, a feature vector for the input. The feature vector obtained from the pixel-salience neural network 120 represents a pixel-level saliency matrix of the image. The saliency matrix is a pixel-by-pixel representation of the image. Each pixel can have a value that represents the salience of the pixel within the image. In some implementations, the value may be between 0-255, in which higher numbers correspond to higher salience. In some implementations, the pixel-level saliency matrix may be a two dimensional matrix, e.g., 80×45. This matrix is the pixel-level feature vector for the image representing the zoom level of the element. The saliency feature generator 112 generates a pixel-level feature vector for each zoom level of each element in the content. Thus, for example, each element has a first pixel-level vector for the lowest zoom level, a second pixel-level feature vector for the highest zoom level, and optionally a third pixel-level vector for an intermediate zoom level. In some implementations the saliency feature generator 112 may stack the feature vectors depth-wise to generate a feature vector of three dimensions, e.g., 3×80×45. The saliency feature generator 112 returns the pixel-level feature vectors and the vector of simple features for each element of the content item.

The training module 130 trains the content saliency neural network 110 with the pixel-level feature vectors, the simple feature vector, and the eye gaze data. In some implementations at least 300 training content items 132 may be used to fully train the content saliency neural network 110. Of course, fewer or more training content items may be used, although quality of the prediction suffers if not enough training content items 132 are used. The training includes providing, for each element of each training content item, a training example. The training example includes the pixel-level feature vectors (e.g., three pixel-level feature vectors, one at each of three zoom levels), the vector of simple features, and the saliency score for the element. The saliency score for the element represents ground truth for that element of the content item. The training enables the neural network to learn weights for the mapping function so that given the input (the feature vectors), the content saliency neural network provides the desired output (ground truth for the input). In other words, training is using the training examples to let the neural network, over a series of iterative training rounds, determine optimal weight values in the mapping function that results in the neural network outputting the ground truth for a training example. In some implementations, the content saliency neural network 110 may use a mean square loss function as the mapping function to learn to predict the ground truth, although other known functions, such as cross-entropy loss, may be used.

Once trained, the content saliency neural network 110 is ready to be used in an inference mode. In an inference mode, the content saliency neural network 110 takes as input the feature vectors for a content element and provides, in return, a saliency score for the element. The saliency score represents the saliency probability for the element. In some implementations, the probability may represent a number between zero and one inclusive. In an inference mode the content saliency neural network 110 may be available for making predictions for unseen content elements. In some implementations, the content saliency neural network 110 may be accessed at a server, e.g., computing device 102. A content creator 158 may use computing device 150 to access the content saliency module 116 via network 140, for example. In some implementations the content saliency neural network 110 may be pushed or downloaded to a client device, such as computing device 150. The computing device 150 may store a local copy 154 of the content saliency neural network. In some implementations, components of the content saliency module 116 may also be pushed or downloaded to the computing device 150 as content saliency module 156. Content saliency neural network 154 functions the same as the content saliency neural network 110, so reference to one in an inference mode is considered a reference to either. Likewise, components of the content saliency module 156 function the same as the components of the content saliency module 116, so reference to one can be considered reference to either in this disclosure. For ease of discussion, reference will be made to content saliency module 116 and content saliency neural network 110.

In some implementations, the content creator 158 may access the content saliency module 116 as part of a content design program. In other words, the functionality of the content saliency module 116 and content saliency neural network 110 may be a tool in a content design program, such as DREAMWEAVER, ADOBE ACROBAT, ADOBE CAMPAIGN, ADOBE XD CC, etc.

Figure 8:
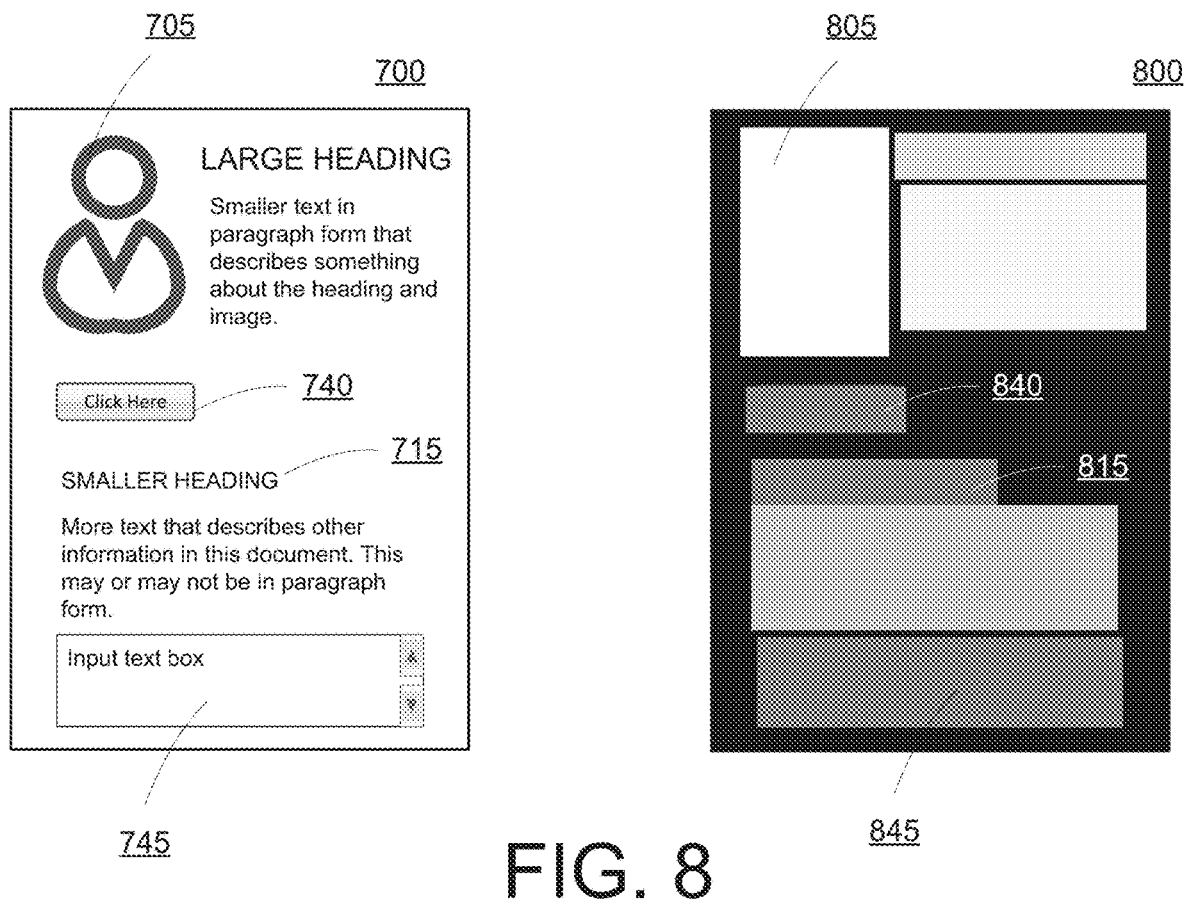
FIG. 8 illustrates an example saliency map for the content item illustrated in FIG. 7, according to one example.

The content saliency module 116 may receive a draft content item from a content creator 158, e.g., using computing device 150. The content saliency module 116 converts the content to an image, identifies the elements in the content, and computes feature vectors for each element, as described above. The content saliency module 116 provides the feature vectors for each element to the content saliency neural network 110, which provides a saliency score for each element. The content saliency module 116 converts the saliency scores for the content elements into a saliency map, e.g., using saliency map generator 114. Although shown as part of the content saliency module 116, saliency map generator 114 may be a separate component in communication with the content saliency module 116. A saliency map shows the elements in a content item represented by their respective saliency scores. In some implementations, the saliency map may be a heat map, which uses differing colorations representing different ranges of saliency scores. For example, white may represent a top 10% of saliency scores, dark gray may be a bottom 10% and other varying shades of gray may represent ranges in the middle. As another example, red may represent top 10%, orange the previous 10%, etc. and a bottom 10% being represented by deep purple. Coloration may also include patterns used to represent the saliency score ranges. Of course the particular coloration is not limiting. FIG. 8 illustrates an example saliency map 800 for content item 700. Lighter areas in FIG. 8 represent greater saliency.

Figure 2:
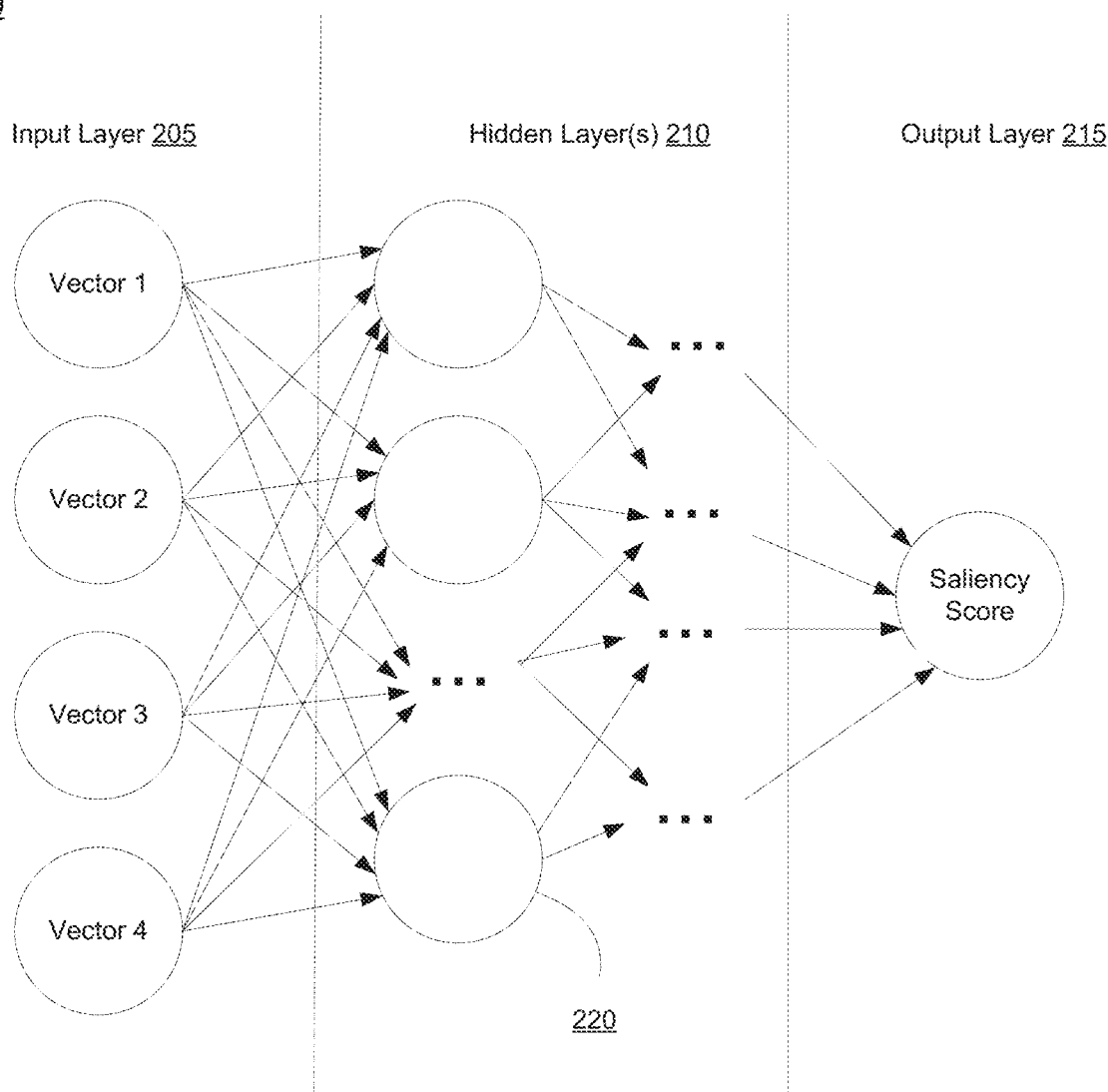
FIG. 2 is a block diagram of example inputs and output for a saliency neural network, according to an implementation.

FIG. 2 is a block diagram of an example content saliency neural network 200, according to an implementation. The example network 200 is one example of the content saliency neural network 110 of FIG. 1. Other implementations may include a configuration different from the configuration described by network 200. For example, other implementations may include additional inputs, additional hidden layers, or additional nodes in the hidden layers. Such additional hidden layers may be fully connected or convolutional.

In the example network 200 of FIG. 2, the content saliency neural network has an input layer 205, hidden layers 210 and an output layer 215. The input layer 205 includes four inputs. The four inputs represent a vector of simple features for the element, and three pixel-level feature vectors, each representing a different zoom level for a content element. For example, a first pixel-level feature vector may be for the entire content item, a second pixel-level feature vector may be for the element itself, and a third pixel-level feature vector may be for an intermediate zoom level. Of course other implementations may use additional zoom levels adding additional pixel-level feature vectors, or may not include the intermediate zoom level pixel feature vector.

The network 200 also includes hidden layers 210. The neural network 200 is a deep neural network that includes several hidden layers 210. The hidden layers 210 can include a number of neurons 220, e.g., 40, 100, 275, 500, etc., neurons. The number of neurons can vary across hidden layers. Each neuron 220 receives the input from the input layer 205. In other words, the neurons 220 are fully connected to the input layer 205. In some implementations the neurons 220 may be rectified linear units (ReLU). In other words, the hidden layers 210 may have ReLU activation. Although only one layer is illustrated, it is understood that there may be many hidden layers and each layer may include different numbers of nodes. The layers may be convolutional or fully connected. The output layer 215 is a single neuron that outputs the predicted saliency score for the content element.

Figure 3:
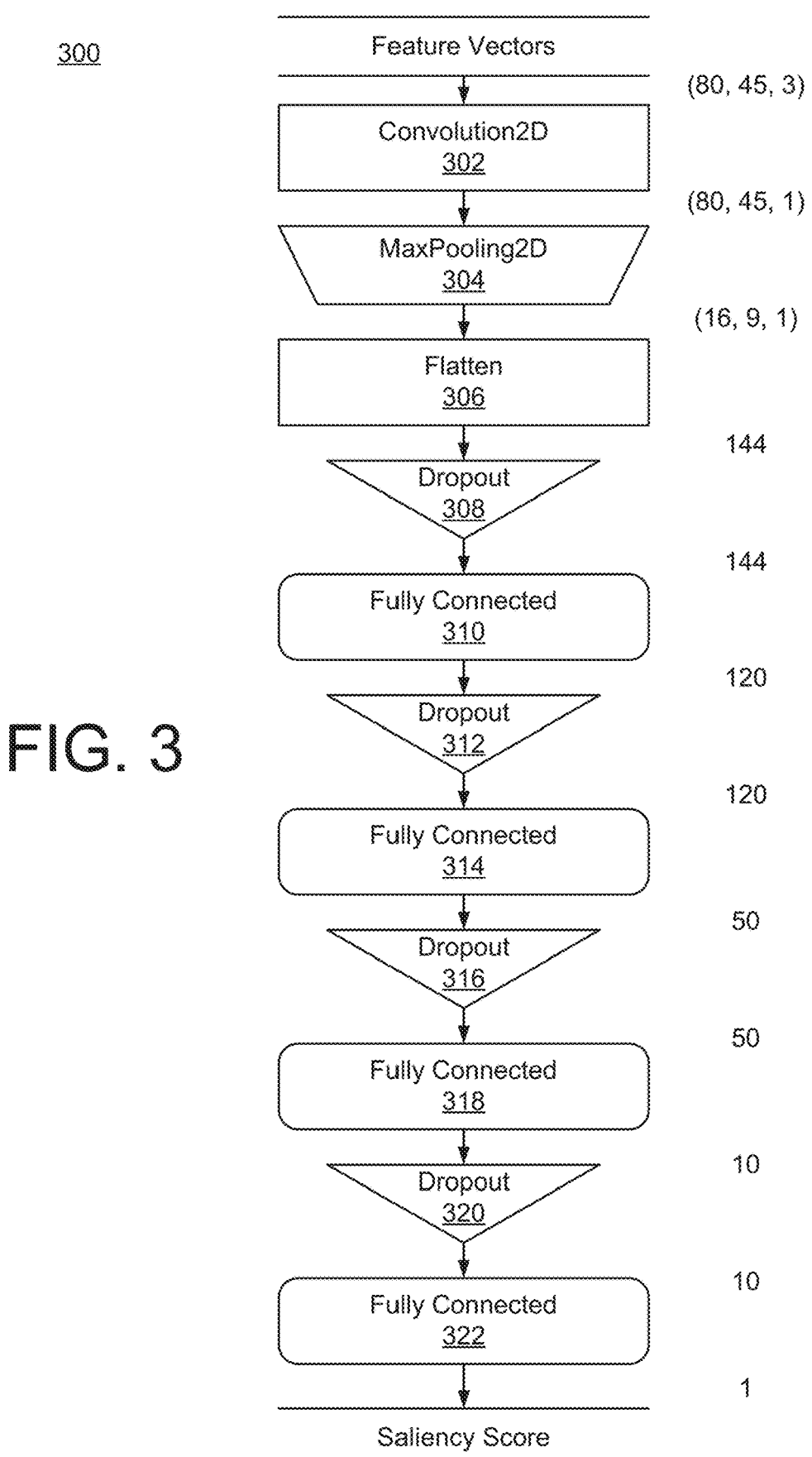
FIG. 3 is a block diagram of an example saliency neural network configuration, according to an implementation.

FIG. 3 is a block diagram of an example content saliency neural network 300 configuration, according to an implementation. The example network 300 is one example of the content saliency neural network 110 of FIG. 1. Other implementations may include a configuration different from the configuration described by network 300.

Figure 4:
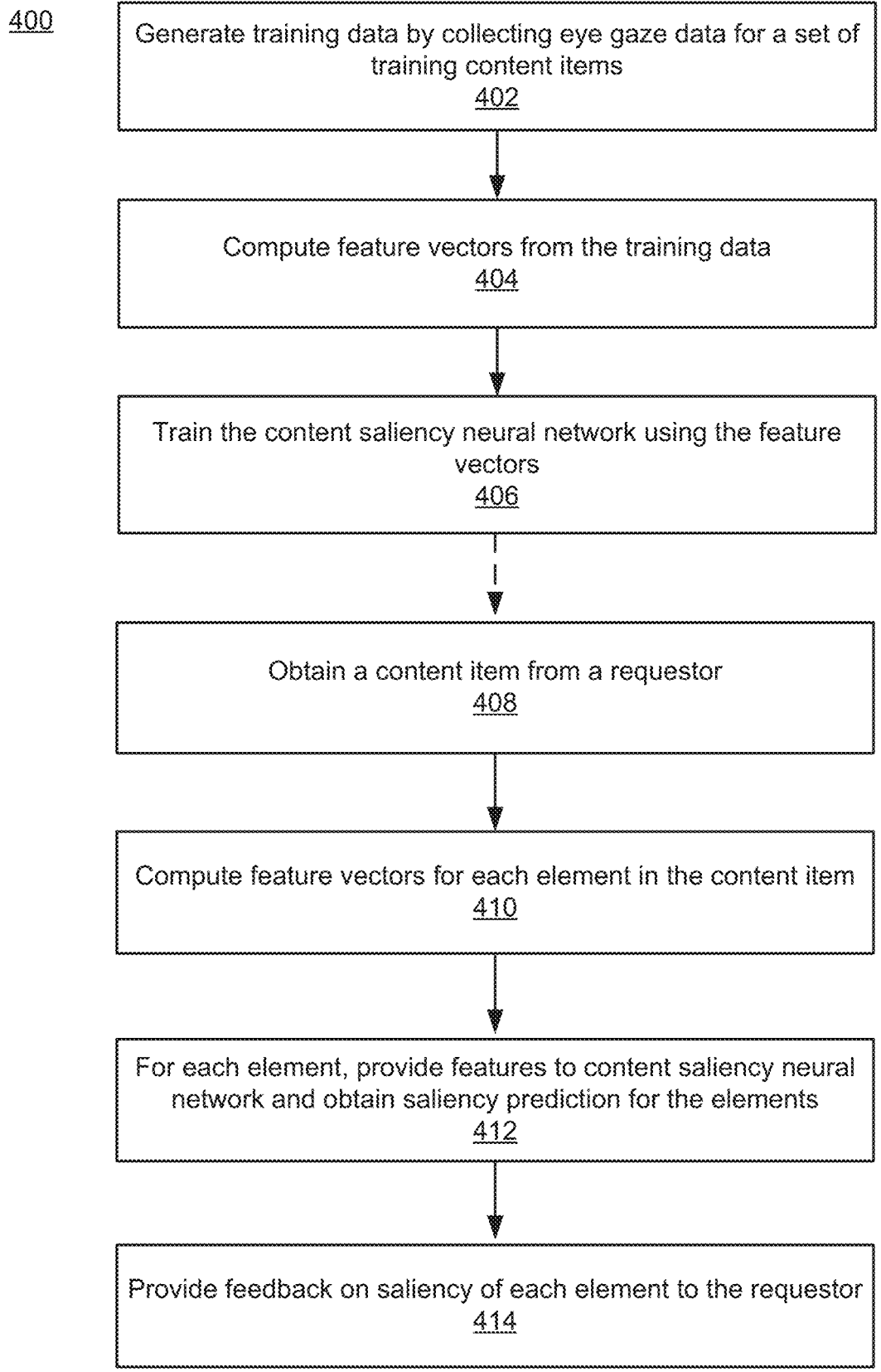
FIG. 4 is an example flowchart illustrating an example process performed by the system of FIG. 1.

The content saliency neural network 300 takes as input feature vectors for a content element. The feature vectors may be a matrix of numbers. In one example, the matrix may have a dimension of (80, 45, 3). The feature vectors are provided to a convolutional layer 302, and max pooling layer 304 at the beginning, followed by a flatten layer 306. Max pooling layer 304 is used to reduce the size of the input, e.g., from dimension (80, 45, 1) to (16, 9, 1). In some implementations, the content saliency neural network 300 includes a max pooling layer after each convolutional layer. The flatten layer 306 reduces the input to a single dimensional vector. The input is provided next to a dropout layer 308 and a network of fully connected layers 310, 314, 318, and 322 and dropout layers 312, 316, and 320. Dropout layers are used in between every pair of dense layers, i.e., fully connected layers, in order to prevent over-fitting. In some implementations, the final fully connected layer has units with ReLU activation. Of course network 300 is one example and other configurations may be used FIG. 4 is an example flowchart illustrating an example process 400 performed by the system of FIG. 1. Process 400 may be performed by a system such as system 100 of FIG. 1. Process 400 trains a content saliency neural network to predict a saliency score for a given content element, e.g., represented by feature vectors. Process 400 uses the content saliency neural network to generate a saliency map that illustrates which elements are salient in the content item. Thus, the content saliency neural network provides a new tool to a content creator to more quickly and with more accuracy lay out a content item to maximize desired information exchange.

Process 400 includes generating training data by collecting eye gaze data for a set of training content items (402). This process is described in more detail below with regard to FIG. 5. The system may generate feature vectors for each of the elements in each of the training content items (404). The feature vectors include a simple feature vector and at least two pixel-level feature vectors. The simple feature vector is based on features of the element, such as width of the element, height of the element, position of the element within the content item, color distribution, such as the first and second color moment for each color channel, etc. The pixel-level feature vectors represent pixel-level saliency vectors at varying zoom levels, including a highest zoom level (the element) and a lowest zoom level (the content item). At least one intermediate zoom level may also be used. The generation of feature vectors is described below in more detail with regard to FIG. 6. Each feature vector set-saliency score pair for an element is a training example for the content saliency neural network. The feature vectors represent the input and the saliency score the desired output given the input.

The system may train a content saliency neural network using the feature vectors (406). During the training mode the content saliency neural network learns how to predict the given saliency score for a content element given the feature vectors for that element. This may be done over a number of iterative rounds. For example, the same training data (e.g., the feature vectors for all the elements in the set of training content items and the respective saliency score for each element) may be used over 8,000, 15,000, 25,000, 40,000, etc. rounds. With each round the neural network adjusts weights of the mapping function so that the predictions get closer to matching the saliency score. Training ends after a number of predetermined rounds or after the predictions converge with the ground truth, e.g., are within an acceptable range of the ground truth. Once the content saliency neural network is trained, it is ready for use in an inference mode, or in other words to being making predictions for unseen content elements.

After the content saliency neural network is trained, the system may receive a content item from a requestor (408). The requestor may be a content creator and the request made by a process used by the content creator. The content item is a draft version of the content, meaning the content creator has not finalized the content. Put another way, a draft content item is a content item that has not yet been received by and/or viewed by the intended recipient. The content item can be, for example, an email message. The system computes feature vectors for the elements of the content (410). This process is described in more detail below, with regard to FIG. 6. The system may, for each element of the content item, provide the features to the content saliency neural network as input and obtain a saliency score for the element from the content saliency neural network (412). The system may then provide feedback on the saliency of each element in the content item to the requestor (414). In some implementations, this may include generating a saliency map. The saliency map recreates the layout of the content item but with the area corresponding to each element replaced with a bounding box having a coloration that is dependent on the saliency score for the element. In other words, each element is replaced with a shape that has an appearance that corresponds with the saliency score for the element. For example, elements with a high saliency score may be white, elements with a low saliency score may be dark gray, and elements with a medium saliency score may be light gray. As another example, elements with a saliency score in the top 10% may be red, elements with a saliency score in the 11-20% range may be orange, elements with a saliency score in the 21-30% range may be yellow, etc., with elements in the bottom percentages dark purple, or black. Of course other colorations, including different patterns, may be used. In some implementations, the feedback may include changing some other aspect of the content item, such as drawing a yellow box around the most salient elements, the color of the border of the box being dependent on the saliency score. As another example, the system may simply provide the saliency score for each element and a requesting process may produce a graphic or visual or an alert for the content creator. Process 400 then ends.

A content creator may repeat steps 408 to 414 many times. In some cases the content creator may perform steps 408 to 414 for two versions of the same content item, which enables the content creator to see a side-by-side comparison, e.g., side-by-side saliency maps of the two versions. Such comparisons are not only much faster than obtaining human feedback, but also more accurate, as the subjective opinion of human reviewers does not reflect objective eye gaze data.

Figure 5:
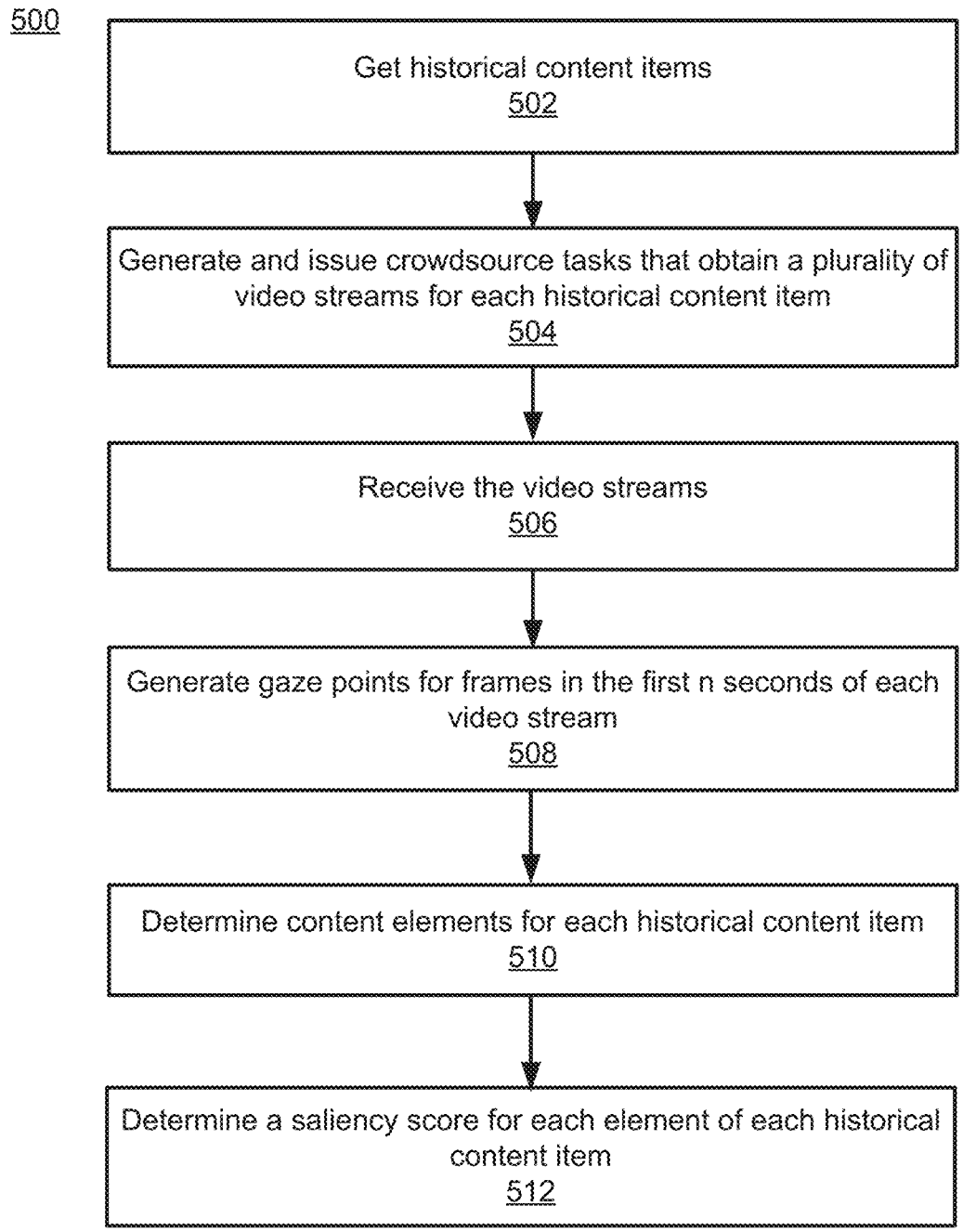
FIG. 5 is an example flowchart illustrating an example process for generating training data to train a content saliency neural network, according to an implementation.

FIG. 5 is an example flowchart illustrating an example process 500 for generating training data to train a content saliency neural network, according to an implementation. Process 500 may be performed as part of step 402 of FIG. 4. Process 500 obtains data from which the system can generate training examples for training the content saliency neural network, e.g., network 110 of FIG. 1.

Process 500 begins by obtaining a set of training content items (502). The set of training content items are referred to as historical content items, e.g., content items that have already been seen by viewers. For example, the content items in the set of training content items may be email messages sent as part of a publicity campaign. Of course other types of content items may be used, such as promotional pamphlets, brochures, posters, documents, etc. The training content items are text-based, e.g., communicating a message with words. In some implementations, the set of training content items may include hundreds, e.g., at least 300, training content items. Fewer content items may be used but may negatively affect the quality of the saliency prediction. More training content items may also be used. Increasing the number of training content items may increase the cost of generating the training examples and of training the content saliency neural network. The training content items include a variety of examples of design. In other words, the more variety in terms of look that is represented by the training content items, the more accurate the trained neural network will be. The variety represents well-designed content items as well as poorly designed content items. Whether a content item is well- or poorly-designed may be determined by human raters, results of an advertising campaign, etc.

The system may generate and issue a series of crowd-source tasks designed to obtain a plurality of video streams for each of the content items in the set of training content items (504). The crowd-source tasks are performed by workers. For example, a worker may sign up to perform tasks offered by crowd-source websites, such as MECHANICAL TURK. Each crowd-source task may include showing one of the content items to the worker and recording the worker as the worker views the content item. The recording may be made with a front-facing or web camera as the worker views the display. In some implementations, each task may involve showing the worker a plurality, e.g., 10, 12, 15, etc. of the training content item, so that one worker provides a video stream for each one of the plurality of training content items in that task. Each worker may get a different set of content items in her respective task. The crowd-source tasks may be designed to gather a plurality of video streams, e.g., 8, 15, 20, etc., for each content item, each video stream being for a different worker.

The system may receive the video streams (506) and associate each video stream with its respective content item. The system may generate gaze points for frames of the video stream that fall within the first n seconds (508), n being a predetermined integer. To generate the gaze points the system may process each video stream to determine, for each frame of video, where on the display the worker is looking. This point is called a gaze point and can be represented by an x,y coordinate. The gaze points for n seconds of video may be captured and stored for each training content item. Thus, the system stores, for each video stream of each training content item, a set of eye gaze data. For example if each content item has ten corresponding video streams, the system generates ten sets of eye gaze data for each content item. The system may only determine and/or store the eye gaze data for the frames of the video stream that fall within the first n seconds.

The system also determines what elements exist for each of the content items in the set of training content items (510). The system may determine the elements at any time before step 512. The elements in each training content item may be determined by a user or may be automatically detected by the system, e.g., using a DOM tree or similar structure, as described herein. The system may calculate a saliency score for each element of each content item in the training set of content items using the eye gaze data for the content item (512). The system may determine the saliency score for an element by computing the proportion of gaze points in the set of gaze points (e.g., over all workers) that fall on any pixel belonging to the element. In some implementations, the system may interpolate the pixels belonging to any element larger than a predetermined area using bicubic interpolation to a fixed number of pixels. This avoids biasing the saliency score towards large elements. The total number of gaze points is dependent on the number of video streams per content item, the number of frames per second in the video streams, and the seconds (i.e., the value of n). The total number of gaze points is the product of these three values. To calculate the proportion, the system determines for each element how many of the total possible gaze points fall on pixels associated with the element. Thus, the saliency score for the element falls between zero and 1 inclusive. Of course a scaling factor may be applied so that the range is greater than zero to 1. The saliency score for an element is also referred to as the ground truth for the element because the score is based on actual eye gaze data and not a subjective opinion. Process 500 then ends, having identified the elements in each content item and calculated a ground truth saliency score for each element.

Figure 6:
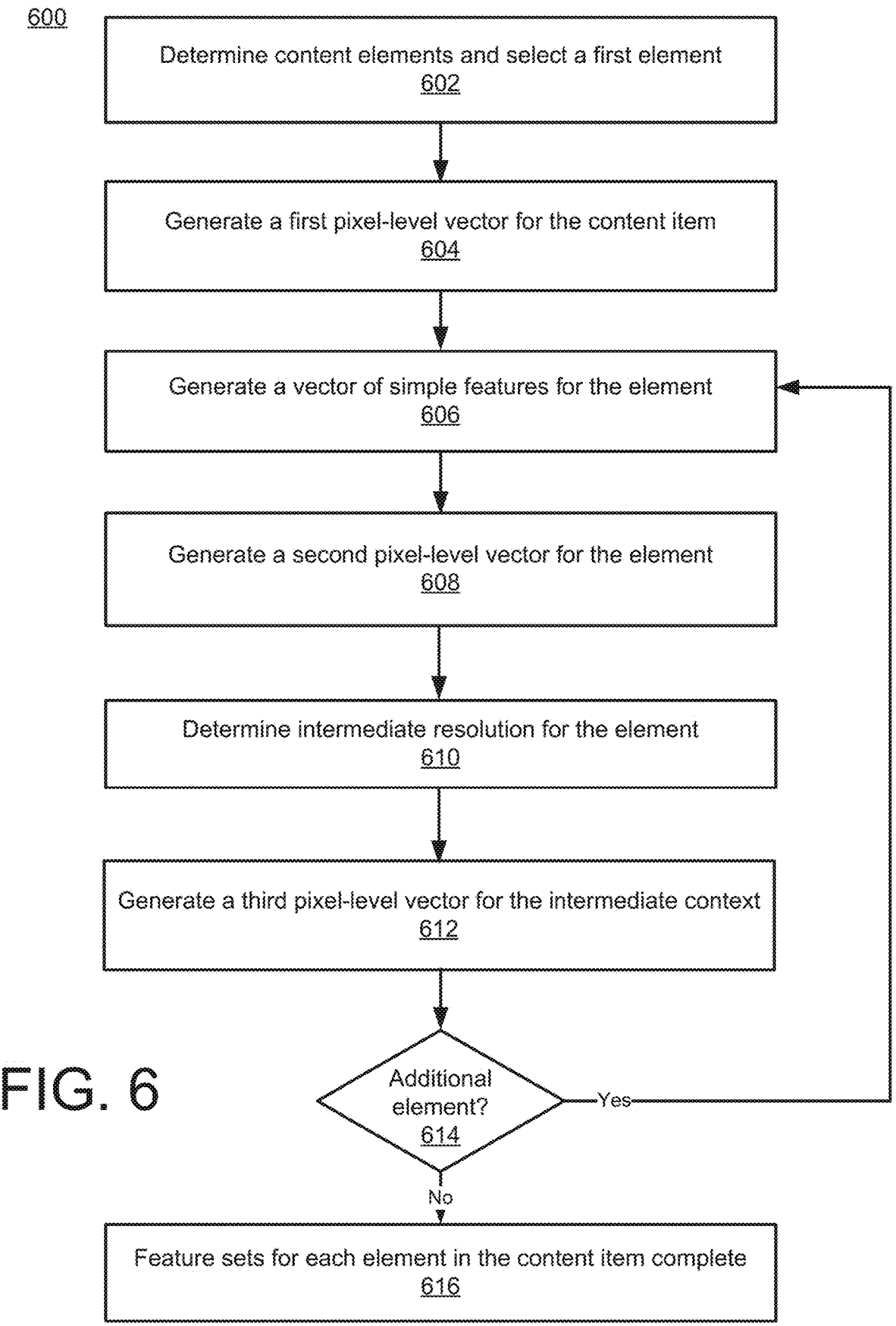
FIG. 6 is an example flowchart illustrating example process for generating input feature vectors for input to a saliency neural network, according to an implementation.

FIG. 6 is an example flowchart illustrating an example process 600 for generating input feature vectors for input to a content saliency neural network, according to an implementation. Process 600 may be performed as part of steps 404 or 410 of FIG. 4. Process 600 takes as input a content item, e.g., an email, determines which elements are present in the content item, and computes a set of feature vectors for each element in the content item.

Process 600 begins by determining the elements of the content item (602). In some implementations, the content elements may be identified or tagged as such by a user. For example, a user, such as the content creator or the system administrator setting up the training content items, may use a graphical user interface to draw a bounding box around each element in the content item. The bounding box need not be rectangular, but can be drawn free-hand or circled, etc. Rectangular may be the most common selection because the content items are text-based. In some implementations, the system may determine the elements based on internal tags in the content. For example, content that is based on a mark-up language, such as HTML, may include tags that surround each object. For example, a paragraph in an email may be marked by a paragraph tag <p>, a list by a list tag <ul>, an image with an image tag <img>, a table with a table tag <table>, etc. Such tags may be used to designate content elements. In some implementations, the system may use a DOM tree to identify elements. In general, an element is any object on which the content creator can take action. Once the elements of the content item have been identified, the system may select a first element.

The system generates or computes a first pixel-level vector for the content item (604). Because this is the lowest zoom level, in some implementations, this vector can be computed once and used for each element. In some implementations, it may be computed for each element. Computing the pixel-level vector may be accomplished via transfer learning. In transfer learning one neural network is used to generate input for another neural network. For example, the system may use a pixel-level saliency neural network to generate the first pixel-level feature vector. The pixel-level saliency neural network may take as input an image and provide as output a two dimensional feature vector representing saliency scores for pixels in the input image. An example of a pixel-level saliency neural network is SalNet developed by J. Pan et al. The pixel-level saliency neural network does not work well for content items because it is trained on natural images and not text-based content. The first pixel-level feature vector represents a lowest zoom level for the element, as the system cannot zoom out farther than the content item itself. Thus, the first pixel-level feature vector includes the most context information for the element.

The system may also generate a second pixel-level feature vector for the element (608). To generate the second pixel-level feature the system may provide an image that represents the element, by itself, to the pixel-level saliency neural network. The output of the pixel-level saliency neural network is the second pixel-level feature vector. The second pixel-level feature vector represents a highest zoom level and includes no or very little additional context information. In some implementations, the system may include a pixel-level vector for one or more intermediate zoom levels. In such implementations, the system may determine an intermediate resolution for the element (610). The intermediate resolution may be an image that includes the element and portions of the immediate surroundings of the element. In some implementations, the system may determine the immediate surroundings using a distance between the element and the edge of the content item. For example, the system may determine, for each side of a bounding box for the element, a mid-point between the side and the corresponding edge of the content item. The system may use these mid-points to determine an intermediate bounding box and any pixels from the image that fall within the intermediate bounding box may be included in the intermediate resolution for the element. The system generates a third pixel-level vector for the intermediate resolution by providing the intermediate resolution to the pixel-level saliency neural network. The output from the pixel-level saliency neural network is the third pixel-level feature vector for the element. The third pixel-level vector represents an intermediate zoom level and includes an intermediate level of context information, i.e., less than all (or almost all) but more than none (or almost none). In some implementations, the system may generate pixel-level feature vectors for more than one intermediate zoom level. For example, rather than finding the mid-point, the system may use a point one-third of the way between the edge of the element and the edge of the content item to determine the image used for a first intermediate resolution corresponding to the third pixel-level feature vector and may additionally determine a second intermediate resolution that uses a point two-thirds of the way between the edge of the element and the edge of the content item to determine an image used to generate a fourth pixel-level feature vector.

In some implementations, the system may optionally stack the first pixel-level feature vector, the second pixel-level feature vector and the third pixel-level feature vector depth-wise to generate a combined pixel-level feature vector. This combined pixel-level feature vector may be used as input into the content saliency neural network. If there are additional elements in the content item that do not have generated features (614, Yes), the system may repeat steps 606 to 612 for the next element. In some implementations, step 604 may also be performed for the next element. In some implementations, the system may use the first pixel-level vector generated for the first element. When features have been generated for all elements (614, No), the system has generated feature vectors for each element in the content item (616) and process 600 ends.

FIG. 7 is an illustration of example elements 705, 710, and 715 included in a content item 700. FIG. 7 also illustrates the various zoom levels, also referred to as resolutions, used to generate the pixel-level feature vectors. In the example of FIG. 7, the system may generate a first pixel-level feature vector for the content item 700. This feature vector may be common for all of the elements in the content item. The pixel-level feature vector may be a two dimensional matrix. The system may also generate a second pixel-level feature vector for each of element 705, element 710, and element 715, as well as the remaining elements that are not illustrated in FIG. 7 for the sake of brevity, such as the "click here" button. The system may generate an image of the content item 700 and determine which pixels in the image correspond to the element. If the element is very large, in some implementations, the system may reduce the set of pixels that correlate to the element. For example, the system may use bicubic interpolation to interpolate the pixels to a fixed number of pixels. These pixels may be provided to the pixel-level saliency neural network. This reduces a bias of the saliency scores towards elements with a larger number of pixels. In some implementations, any element that meets or exceeds a minimum area will be interpolated. The system thus generates a respective second pixel-level feature vector for each element, which is also two dimensional matrix.

The system may also generate, for each element, an intermediate resolution. The intermediate resolution represents an area immediately surrounding the element, but is smaller than the entire content item. In the example of FIG. 7, intermediate resolution 720 includes element 705 and pixels corresponding to an area immediately surrounding element 705. In the example of FIG. 7, the area immediately surrounding element 705 is determined by locating a point mid-way between each edge of element 705 and the corresponding edge in the content item 700. Thus, for example, the area immediately surrounding the left and top sides of the element 705 is smaller than the area immediately surrounding the right and bottom sides because the element 705 is closer to the left and top edges of the content item 700. Thus, the immediate area included in the intermediate resolution may be inversely proportional to the original content item dimensions. Similarly, intermediate resolution 725 corresponds to the area immediately surrounding element 710 and intermediate resolution 730 corresponds to the area immediately surrounding element 715. The other elements of the content item 700 would also have corresponding intermediate resolutions. The third pixel-level feature vector is generated from an image that includes the pixels corresponding to the intermediate resolution for an element. In some implementations, the system may reduce the set of pixels that correlate to the intermediate resolution. For example, the system may use bicubic interpolation to interpolate the pixels to a fixed number of pixels. These pixels may be provided to the pixel-level saliency neural network, similar to the interpolation process described above for the content element.

FIG. 8 illustrates an example saliency map for the informational content item 700, according to one example. In the example of FIG. 8 the content item 700 includes seven different elements. Accordingly, the saliency map 800 includes seven element areas, each area corresponding to one of the elements. The element areas of the saliency map 800 are laid out based on the location of the corresponding element in the original content item. This layout provides a quick visual correspondence between the areas and the original content item. Each element area in the saliency map has a coloration that corresponds to the saliency code determined by the content saliency neural network using the techniques described herein. In the example of FIG. 8 a lighter coloration corresponds to a higher saliency score for the element. For example, the element area 805 that corresponds to element 705 in content item 700 is white, indicating this element is most prominent to readers. In contrast, element areas 815, 840, and 845, which correspond to elements 715, 740, and 745 respectively, have dark coloration, indicating a reader is not likely to pay much attention to these elements in the first n seconds of viewing. If the content creator of content item 700 wants element 705 to be prominent and cares less about elements 715, 740, and 745 then the layout is good. However, if the content creator wants element 740 to be more prominent, the content creator can play with the arrangement, size, and appearance of the elements to ensure that element 740 increases in saliency.

FIG. 9 illustrates additional example saliency maps. In the example of saliency map 905, elements in the group of elements 907 represent similarly sized images. Some of the images in the group of elements 907 have more salience than others. If this is not the intent, the content creator may consider changing the layout of the images so that the images have similar saliency. In the example of saliency map 910, the element areas use a pattern to convey saliency. Thus, different colorations include different patterns of the same color. In the saliency map 910 patterns with the most whitespace between lines have higher saliency than patterns with less white space. The saliency map 910 illustrates that the corresponding content item has many elements, and each of these elements has a similar saliency. The saliency map 910 includes element area 912, which corresponds to a call to action (e.g., a button or link) in the corresponding content item. Based on the saliency map 910, the content creator may decide to reduce the clutter (i.e., reduce the number of elements) to raise the saliency of the call to action corresponding to element area 912. Saliency map 915 illustrate that the element corresponding to element area 917 has prominence over the element corresponding to element area 919. If this is not the intent of the content creator, the content creator may change the layout so that the two elements receive a similar saliency.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit). Method steps may also be performed in a different order than illustrated in the figures.

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes, and equivalents will now occur to those skilled in the art. It is, therefore, to be understood that the appended claims are intended to cover all such modifications and changes as fall within the scope of the embodiments.

According to one general aspect a computer-implemented method for training a content saliency neural network includes obtaining, using at least one processor, eye gaze data for each of a plurality of email messages, wherein the eye gaze data for each email message in the plurality of email messages includes data from a plurality of viewers of the email message and wherein the eye gaze data includes, for each email-viewer pair, a set of coordinates that correspond to a location in the email message. Each email message in the plurality of email messages includes a respective set of elements. The method also includes, for each email message in the plurality of email messages, computing a first pixel-level vector for the email message, the first pixel-level vector being a saliency matrix for an image that represents the email message and, for each element in the respective set of elements, determining a saliency score for the element by determining a proportion of coordinates from the set of coordinates for the email message that correspond to the element, computing a vector of simple features for the element, the simple features being computed from attributes of the element, computing a second pixel-level vector for the element, the second pixel-level vector being a saliency matrix for an image that represents the element, and computing a third pixel-level vector for an intermediate context of the element, the third pixel-level vector being a saliency matrix for an image that represents the intermediate context of the element. The method further includes training, by the at least one processor, the content saliency neural network to predict the saliency score for the element given the first pixel-level vector, the second pixel-level vector, the third pixel-level vector, and the vector of simple features. The method may also include providing the content saliency neural network for use in generating an element-level saliency map for a later-drafted email message.

These and other aspects can include one or more of the following features. For example, the eye gaze data can be obtained from a viewer of the plurality of viewers as a crowdsource task. As another example, the eye gaze data obtained from a viewer may represent a predetermined number of seconds for which the viewer viewed the email message from the plurality of email messages. As another example, the eye gaze data, i.e., the set of coordinates can be obtained from a set of video frames recorded using a front-facing camera. As another example, computing the first pixel-level vector for the content item can include providing the content item to a natural-image saliency neural network and receiving the first pixel-level vector from the natural-image saliency neural network. As another example, the element may have a bounding box and the intermediate context represents an area of the email message determined by a halfway point between each edge of the bounding box and the edges of the image representing the email message. As another example, the attributes of the element are selected from a group including color distribution, size of the element, and position of the element.

According to one aspect, a method includes determining, using at least one processor, a set of elements in a draft email message provided by a requestor and computing a first pixel-level vector for the email message. The first pixel-level vector may be a saliency matrix for an image that represents the email message. The method may also include, for each element in the set of elements, computing a vector of simple features for the element, the simple features being computed from attributes of the element, computing a second pixel-level vector for the element, the second pixel-level vector being a saliency matrix for an image that represents the element, computing a third pixel-level vector for an intermediate context of the element, the third pixel-level vector being a saliency matrix for an image that represents the intermediate context of the element, and providing the first pixel-level vector, the second pixel-level vector, the third pixel-level vector, and the vector of simple features to a neural network trained to predict, for a given element of an email message, a saliency score for the element. The neural network provides a saliency score for the element responsive to receiving the first pixel-level vector, the second pixel-level vector, the third pixel-level vector, and the vector of simple features. The method further includes generating an element-level saliency map of the email message using the respective saliency scores for the set of elements and providing the element-level saliency map to the requestor.

These and other aspects may include one or more of the following features. For example, computing the first pixel-level vector for the email message may include providing the email message to a pixel-level saliency neural network and receiving the first pixel-level vector from the pixel-level saliency neural network. As another example, computing the third pixel-level vector for the intermediate context may include providing the intermediate context to a natural-image saliency neural network and receiving the third pixel-level vector from the natural-image saliency neural network. As another example, providing the first pixel-level vector, the second pixel-level vector, and the third pixel-level vector to the neural network can include stacking the first pixel-level vector, the second pixel-level vector, and the third pixel-level vector depth-wise. As another example, the simple features may include a width of the element and a height of the element, a first color moment for each color channel and a second color moment for each color channel, and/or a position of the element within the email message. As another example, determining the set of elements includes selecting elements from a document object model.

In one aspect, a computer program product embodied on a non-transitory computer-readable storage medium and comprising a content saliency neural network and instructions that, when executed by a computing device, are configured to cause the computing device to receive a draft email message from a requestor, the email message including a plurality of elements and, for each element of the plurality of elements, generate a vector of simple features from attributes of the element, generate a pixel-level vector for each of at least three different zoom levels for the element by providing an image of each zoom level to a neural network trained to provide a pixel-level saliency score given an image, and obtain, from the content saliency neural network, a respective saliency score for the element, the saliency score being based on the vector of simple features, and the pixel-level vector for each of the at least three different zoom levels. The instructions are also configured to cause the computing device to generate an element-level saliency map for the email message based on the respective saliency scores and provide the element-level saliency map to the requestor.

These and other aspects may include one or more of the following features. For example, the instructions may also be configured to determine the plurality of elements based on a document object model for the email message. As another example, the content saliency neural network may have been trained on historical email content. As another example, the three zoom levels include the dimensions of the element, the dimensions of the email message, and dimensions of an intermediate zoom level that is inversely proportional to the dimensions of the element. As another example, each element of the plurality of elements may have a bounding box and a coloration of each of the bounding boxes is dependent on the respective saliency score for the element corresponding to the bounding box.

According to one general aspect, a system includes at least one processor and memory storing instructions that, when executed by the at least one processor, cause the system to perform any of the operations or methods disclosed herein.

What is claimed is:

1. A computer-implemented method for training a content saliency neural network, the method comprising:
   obtaining eye gaze data for an email message,
   the email message including a set of elements organized according to a Document Object Model (DOM);
   computing a first pixel-level vector for the email message based on the eye gaze data, the first pixel-level vector being a saliency matrix for an image that represents the email message;
   computing a second pixel-level vector for an element of the set of elements based on the eye gaze data, the second pixel-level vector being a saliency matrix for an image that represents the element;
   determining a point between a side of the element and a corresponding edge of the email message;
   computing a third pixel-level vector for an intermediate context of the element based on the eye gaze data, the third pixel-level vector being a saliency matrix for an image that represents the intermediate context of the element, wherein the intermediate context is defined based on the point between the side of the element and the corresponding edge;
   combining the first pixel-level vector, the second pixel-level vector, and the third pixel-level vector to generate a combined pixel-level feature vector; and
   training, by at least one processor, the content saliency neural network to predict a saliency score for the element based on the combined pixel-level feature vector.

2. The method of claim 1, wherein the eye gaze data is obtained from a viewer of a plurality of viewers as a crowdsource task.

3. The method of claim 1, wherein the eye gaze data obtained from a viewer represents a predetermined number of seconds for which the viewer viewed the email message.

4. The method of claim 1, wherein the eye gaze data includes a set of coordinates is obtained from a set of video frames recorded using a front-facing camera.

5. The method of claim 1, wherein computing the first pixel-level vector for the email includes:

providing the email to a natural-image saliency neural network; and
receiving the first pixel-level vector from the natural-image saliency neural network.

6. The method of claim 1, wherein the element has a bounding box and the intermediate context represents an area of the email message determined by a halfway point between each edge of the bounding box and the edges of the image representing the email message.

7. The method of claim 1, further comprising computing a vector of simple features for the element, the simple features being computed from attributes of the element, wherein the attributes of the element are selected from a group including color distribution, size of the element, and position of the element.

8. A computer system comprising:
at least one processor;
memory storing a neural network trained to predict, for a given element of an email message, a saliency score for the element; and
memory storing instructions that, when executed by the at least one processor, causes the computer system to perform operations including:
determining, using the at least one processor, a set of elements in a draft email message provided by a requestor, wherein the set of elements is organized according to a Document Object Model (DOM),
computing a first pixel-level vector for the email message, the first pixel-level vector being a saliency matrix for an image that represents the email message,
computing a vector of simple features for an element of the set of elements, the simple features being computed from attributes of the element,
computing a second pixel-level vector for the element, the second pixel-level vector being a saliency matrix for an image that represents the element,
for each side of the element, determining a point between the side and a corresponding edge of the email message,
computing a third pixel-level vector for an intermediate context of the element based on the point corresponding to each side of the element, the third pixel-level vector being a saliency matrix for an image that represents the intermediate context of the element,
combining the first pixel-level vector, the second pixel-level vector, and the third pixel-level vector to generate a combined pixel-level feature vector; and
providing the combined pixel-level feature vector to the neural network, the neural network providing a saliency score for the element,
generating an element-level saliency map of the email message using the saliency scores, and
providing the element-level saliency map to the requestor.

9. The system as in claim 8, wherein computing the first pixel-level vector for the email message includes:
providing the email message to a pixel-level saliency neural network; and
receiving the first pixel-level vector from the pixel-level saliency neural network.

10. The system as in claim 8, wherein computing the third pixel-level vector for the intermediate context includes:
providing the intermediate context to a natural-image saliency neural network; and
receiving the third pixel-level vector from the natural-image saliency neural network.

11. The system of claim 8, wherein providing the first pixel-level vector, the second pixel-level vector, and the third pixel-level vector to the neural network includes stacking the first pixel-level vector, the second pixel-level vector, and the third pixel-level vector depth-wise.

12. The system of claim 8, wherein the simple features include a height of the element and a width of the element.

13. The system of claim 8, wherein the simple features include a first color moment for each color channel and a second color moment for each color channel.

14. The system of claim 8, wherein the simple features include a position of the element within the email message.

15. The system of claim 8, wherein determining the set of elements includes selecting elements from a document object model.

16. A computer program product embodied on a non-transitory computer-readable storage medium comprising a content saliency neural network and instructions that, when executed by a computing device, are configured to cause the computing device to:
receive a draft email message from a requestor, the email message including a plurality of elements, wherein the set of elements is organized according to a Document Object Model (DOM);
generate a vector of simple features from attributes of an element of the set of elements;
for each side of the element, determine a point between the side and a corresponding edge of the email message;
generate a first pixel-level vector based on an image that represents the email message, a second pixel-level vector based on an image that represents the element, and a third pixel-level vector based on the point corresponding to each side of the element;
combine the first pixel-level vector, the second pixel-level vector, and the third pixel-level vector to generate a combined pixel-level feature vector;
provide the combined pixel-level feature vector to a neural network trained to provide a pixel-level saliency score given an image;
obtain, from the content saliency neural network, a respective saliency score for the element, the saliency score being based on the vector of simple features, and the three pixel-level vectors;
generate an element-level saliency map for the email message based on the saliency score; and
provide the element-level saliency map to the requestor.

17. The computer program product of claim 16, wherein the instructions that, when executed by the at least one computing device, are also configured to:
determine the plurality of elements based on a document object model for the email message.

18. The computer program product of claim 16, wherein the content saliency neural network was trained on historical email content.

19. The computer program product of claim 16, wherein the pixel-level vectors correspond to zoom levels that include dimensions of the element, dimensions of the email message, and dimensions of an intermediate zoom level that is inversely proportional to the dimensions of the element.

20. The computer program product of claim 16, wherein each element of the plurality of elements has a bounding box and a coloration of each of the bounding boxes is dependent on a respective saliency score for the element corresponding to the bounding box.

\* \* \* \* \*